(12) United States Patent
Benakli et al.

(10) Patent No.: US 8,422,167 B1
(45) Date of Patent: Apr. 16, 2013

(54) TEXTURED MAGNETIC POLES FOR MAGNETIC WRITERS

(75) Inventors: Mourad Benakli, Shrewsbury, MA (US); Michael Mallary, Harmony, PA (US); Amet Kaya, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 836 days.

(21) Appl. No.: 11/739,989

(22) Filed: Apr. 25, 2007

Related U.S. Application Data

(60) Provisional application No. 60/745,611, filed on Apr. 25, 2006.

(51) Int. Cl.
*G11B 5/127* (2006.01)

(52) U.S. Cl.
USPC .................................. 360/125.03; 360/125.16

(58) Field of Classification Search . 360/125.03–125.26
See application file for complete search history.

(56) References Cited

U.S. PATENT DOCUMENTS

| | | | | |
|---|---|---|---|---|
| 5,436,781 | A * | 7/1995 | Matono et al. | 360/125.63 |
| 6,111,723 | A * | 8/2000 | Takano et al. | 360/122 |
| 6,741,524 | B2 * | 5/2004 | Ichihara et al. | 369/13.01 |
| 7,552,524 | B2 * | 6/2009 | Ma et al. | 29/603.16 |
| 2001/0006435 | A1 * | 7/2001 | Ichihara et al. | 360/55 |
| 2002/0170165 | A1 * | 11/2002 | Plumer et al. | 29/603.14 |
| 2003/0021063 | A1 * | 1/2003 | Kuroda et al. | 360/125 |
| 2003/0142431 | A1 * | 7/2003 | Ejiri et al. | 360/55 |
| 2004/0240108 | A1 * | 12/2004 | Shukh | 360/125 |
| 2005/0141137 | A1 * | 6/2005 | Okada et al. | 360/122 |
| 2006/0238917 | A1 * | 10/2006 | Sasaki et al. | 360/126 |
| 2007/0133132 | A1 * | 6/2007 | Carey et al. | 360/324.11 |
| 2007/0253107 | A1 * | 11/2007 | Mochizuki et al. | 360/126 |

FOREIGN PATENT DOCUMENTS

JP 61158017 A * 7/1986

OTHER PUBLICATIONS

Bailey, William et al. Control of Magnetization Dynamice in Ni81Re19 Thin Films Through the Use of Rare-Earth Dopants. IEEE Transactions on Magnetics, vol. 37, No. 4, pp. 1749-1754, Jul. 2001.*
Scholz et al., "Micromagnetic Modeling of Head Field Rise Time for High Data-Rate Recording", IEEE Transactions on Magnetics, Feb. 2005, vol. 41, No. 2, pp. 702-706.

* cited by examiner

*Primary Examiner* — Wayne Young
*Assistant Examiner* — Adam B Dravininkas
(74) *Attorney, Agent, or Firm* — David D. Brush; Westman, Champlin & Kelly, P.A.

(57) ABSTRACT

A magnetic writer is formed with a texture on a surface of a write pole, preferably on a surface associated with the trailing edge of the writer. This texturing results in, in effect, a magnon-magnon scattering process that increases the surface damping of the pole and thus decreases the write field rise time. Rare earth elements can also be added in amounts sufficient to further increase the damping.

12 Claims, 2 Drawing Sheets

TEXTURED MAGNETIC POLES FOR MAGNETIC WRITERS

CROSS-REFERENCE TO RELATED APPLICATION

The present application claims the benefit of U.S. Provisional Patent Application Ser. No. 60/745,611, which was filed on Apr. 25, 2006, by Mourad Benakli and Ahmet Kaya for TEXTURED MAGNETIC POLES FOR WRITE HEADS and is hereby incorporated by reference.

BACKGROUND OF THE INVENTION

1. Field of the Invention

This invention relates generally to a magnetic writer, referred to herein also as a write head, for a magnetic disk drive and to a method of making the head and more particularly, to a write head with a textured pole surface to increase magnon-magnon scattering.

2. Background Information

Developments in magnetic disk drives are generally aimed at increasing the bit density on the disks and, derivatively, increasing the speed of data retrieval. The write heads used to imprint the magnetic bits on the disks are subject to much of the development effort. The heads are made of a soft magnetic material, which ideally, rapidly applies a strong magnetic field to a small area on the disk in conjunction with the switching of the write current to the head.

In order to magnetize as small an area on the disk as possible, the magnetizing field at the tip of the head facing the disk should rise very quickly to its maximum level when the magnetizing current is switched to write to the disk. However, there is a delay resulting from the propagation of magnons, also termed "spin waves." The accumulation of lightly damped spin waves leads to an effective increase in the temperature of the spins that degrades the ferromagnetism of the poles. This can reduce the saturation magnetization and increase transition time.

A known technique to dampen spin waves, and thus, mitigate this effect is to make small additions of rare earth elements, such as Praseodymium, Neodymium, Promethium, Sumarium, Europium, Gadolinium, Terbium, Dysprosium, Holium, Erbium, Thulium, Ytterbium, and Lutetium to the poles, as described in W. Bailey et al., IEEE TransMagn, Col. 37, No. 4, pp. 1748-1754, July 2001. However, sufficient inclusion of to these rare earth elements to provide the desired spin wave damping is accompanied by degradation of the soft magnetic properties of the poles, which leads to increased coercivity, reduced permeability, reduced saturation magnetization and increased magneto striction. They also increase the susceptibility of the poles to corrosion.

The present invention is directed to the damping of the spin waves without requiring the use of excessive amounts of the rare earth elements.

SUMMARY OF THE INVENTION

In accordance with the invention, a texture is formed on or applied to a surface of a write head pole, preferably a surface associated with the trailing edge of the write head. This texturing results in, in effect, a magnon-magnon scattering process that increases the surface damping of the pole and thus decreases the write field rise time. Rare earth elements can also be added in amounts sufficient to further increase the damping, with the amounts being insufficient to cause the deleterious effects described above.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
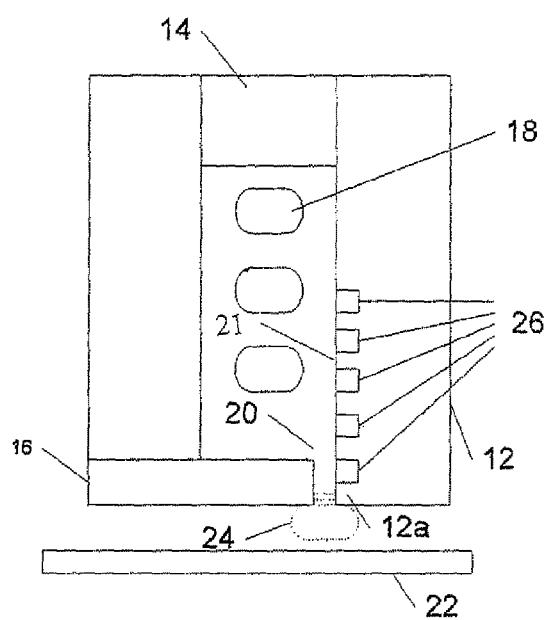
FIG. 1 is a simplified drawing of a write head with a geometrical texturing of a pole surface.
Figure 2:
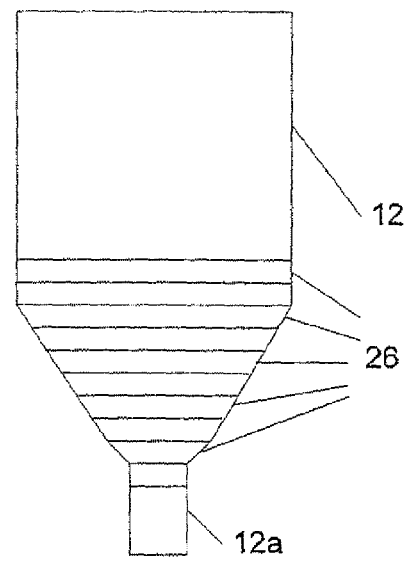
FIG. 2 is a side view of the head of FIG. 1.

As shown in FIGS. 1 and 2, a magnetic write head generally indicated at 10 comprises a write pole 12, a return path comprising a bridge 14 and a magnetic shield 16. A magnetic field is induced in the head by a current through a coil depicted at 18. The field extends across a gap 20 between a pole tip 12a and the shield 16. Immediately below the gap 20, the fringing portion 24 of the field (indicated by dotted lines) extends into a magnetic disk 22 to magnetically imprint dibits in a magnetic layer (not shown) on the disk.

Specifically, the disk 22 moves to the left relative to the head 10, and, as very successive small areas pass by the gap 20, a succession of dibits are recorded on the disk by passing currents through the coil 18. In order to obtain a high density of the dibits, it is important that, as the current in the coil 18 increases, the field in the gap 20 increases as rapidly as possible. Thus, the spin waves (or magnons) accompanying the field change in the pole tip 12a should be quickly damped. To accomplish this, we apply a texture to at least the lower portion of the trailing surface 12a of the pole 12 adjacent to the gap 20. This results in a scattering of the magnons, by magnon-magnon interaction, and thus, a damping of the coherent gyromagnetic modes by coupling them to the damped spin waves. During the plating of the write head, texturing of the pole 12 can be performed. The texturing can be performed at the surface associated with the trailing edge of the write head. The texturing can also be performed in the bulk of the plated or sputtered pole 12 if lamination is used.

For example, as shown in FIGS. 1 and 2, closely spaced grooves 26, which are perpendicular to the direction of motion and parallel to the disk 22, may be formed in the lower portion of the trailing surface 21 of the pole 12. The grooves, which may range in width from about 10 nm to about 50 nm and have depths equal to 0.5 to 1.5 the widths, serve to damp the spin waves. The grooves thus materially decrease the time required for a rapid change in the current through the coil 18 to be reflected in a corresponding change in the magnetic field in the gap 20. Preferably, the texture extends to the pole tip from the region where the width of the pole 12 begins to decrease (see FIG. 2).

Figure 3:
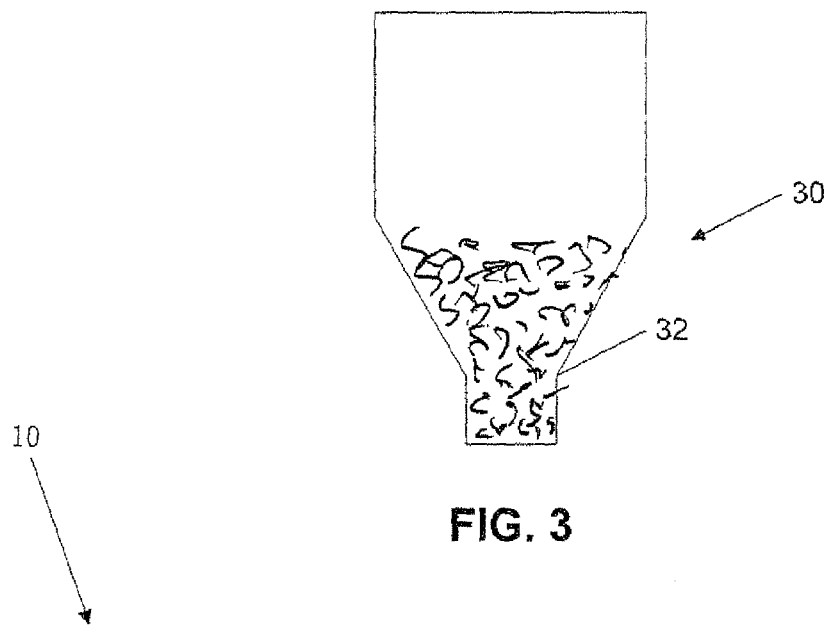
FIG. 3 is an illustration of a write pole having a randomly textured surface.

FIG. 3 illustrates the use of a random texture to accomplish surface damping. The pole 30 depicted therein has been etched to provide a surface roughness (indicated by the reference numeral 32) that results in two-magnon scattering. The "dimensions" provided by the etching may, for example, accord with the dimensions of the grooves in FIG. 1.

The entire pole may be etched with the random texture or, as depicted in the drawing, just the pole tip region may be etched by patterning the etching process, to leave the yoke without the texture. The random texturing may be achived by deliberately contaminating the wafer used in the etching process to provide peaks on the wafer, and trans-fering the peaks to the ferromagnetic pole surface with a pure argon etch.

The wafer may be deliberately contaminated with ceramic nanoparticles (5 nm diameter) which are suspended in a solvent such as isoproply alcohol. The solvent is first applied to the wafer and evaporated away to leave the particles. The wafer surface is then subjected to ion milling, which leaves behind peaks underneath the particles. The particles are then removed by ultrasonic cleaning. Alternatively, the particles may be suspended in a common photo resist known as PMMA which is then used to coat the wafer. The wafer is next subjected to an oxygen/argon ion beam etch to remove most of the PMMA, and leave behind peaks under each particle, and the particles are removed by ultrasonic cleaning. This alternative can readily provide desired etching patterns, which leave, for example, the yoke untextured as discussed above. Other desired patterns of textured and non-textured regions may also be readily achieved. As mentioned above, the technique of achieving spin wave damping by the inclusion of rare earth elements in the pole material can have adverse effects. The present invention may be adventageously combined with that technique, however, such that the required level of damping for fast magnetic switching is achieved using smaller rare earth additions than in prior formulations. This largely avoids the negative impact of the rare earth additions. The concentration of the rare earth elements is preferably between 0.5% and 5%, for example, 1% to 3%, 2% to 4%, and so forth. Rare earth elements Holium and Terbium have been added alone or in combination in low concentrations to the textured poles. Other combinations or individual rare earth elements may also be used.

To further minimize the negative effects of the rare earth additions, it is advantageous to exchange couple the textured pole of the present invention to a ferromagnetic "film" (i.e. a surface treatment) having the rare earth additions, instead of fabricating the entire pole with these additions. In this arrangement, the addition of the rare earth elements can be accomplished by ion implantation, co-sputtering, or in some cases by electroplating (for example, with turbian complexes in the bath).

Figure 4:
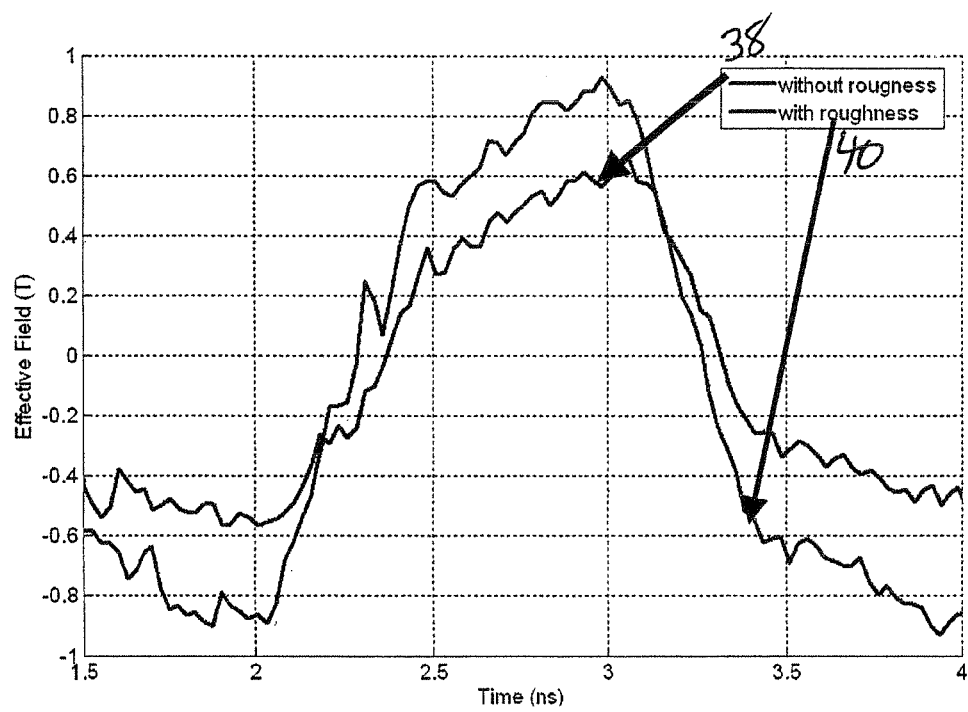
FIG. 4 displays curves showing the decrease in magnetic field rise time provided by the invention.

FIG. 4 illustrates the decrease in magnetization rise time provided by the present invention. The curve 38 illustrates the magnetization obtained with smooth pole piece surfaces and the curve 40 illustrates the magnetization obtained with the textured pole piece of the invention. It is clear that the curve 40 has steeper slopes in the magnetization curve.

What is claimed is:

1. A magnetic writer including:
a magnetic shield;
a pole piece with a textured surface, wherein the textured surface is perpendicular to a magnetic recording medium and is located only at a tip of the pole piece, and wherein the textured surface is a trailing surface of the tip with respect to a direction of motion of the magnetic recording medium, and wherein the textured surface is adjacent a gap between the pole piece and the magnetic shield, which is opposite the trailing surface of the tip; and
an electrical conductor through which currents are passed to effect changes in a magnetic field produced at the tip, wherein the textured surface comprises a series of grooves parallel to the magnetic recording medium and perpendicular to the direction of motion of the medium, and wherein the grooves have widths in the range of 10 nm to 50 nm.

2. The writer of claim 1 wherein the textured surface includes additions of rare earth elements.

3. The writer of claim 2 wherein the rare earth elements are added to a concentration between 0.5% and 5%.

4. The writer of claim 1 wherein the grooves have depths of 0.5 to 1.5 of the widths.

5. The writer of claim 1 wherein the texture of the textured surface has a random configuration.

6. The writer of claim 1 further including a ferromagnetic film that extends over the textured surface, the film having rare earth additions.

7. The writer of claim 1, wherein the pole piece comprises a laminated pole piece and the textured surface is located at only a tip of the laminated pole piece.

8. A digital magnetic recording system comprising:
a magnetic recording medium; and
a magnetic writer for applying a magnetic field to the recording medium, the writer including:
a magnetic shield;
a pole piece, the pole piece having a textured surface, wherein the textured surface is perpendicular to the magnetic recording medium and is located only at a tip of the pole piece, and wherein the textured surface is a trailing surface of the tip with respect to a direction of motion of the magnetic recording medium, and wherein the textured surface is adjacent a gap between the pole piece and the magnetic shield, which is opposite the trailing surface of the tip; and
an electrical conductor through which currents are passed to effect changes in a magnetic field produced at the tip,
wherein the textured surface comprises a series of grooves parallel to the magnetic recording medium and perpendicular to the direction of motion of the medium, and
wherein the grooves have widths in the range of 10 nm to 50 nm.

9. A magnetic writer including:
a magnetic shield;
a pole piece with a textured surface that is located at at least a tip of the pole piece, wherein the textured surface is a trailing surface of the tip with respect to a direction of motion of a magnetic recording medium, and wherein the textured surface is adjacent a gap between the pole piece and the magnetic shield, which is opposite the trailing surface of the tip, and wherein the textured surface comprises a series of grooves parallel to the magnetic recording medium and perpendicular to the direction of motion of the medium; and
an electrical conductor through which currents are passed to effect changes in a magnetic field produced at the tip, wherein the grooves have widths in the range of 10 nm to 50 nm.

10. The writer of claim 9 wherein the grooves have depths of 0.5 to 1.5 of the widths.

11. A magnetic writer including:
a magnetic shield;
a pole piece with a textured surface, wherein the textured surface is perpendicular to a magnetic recording medium and is located only at a tip of the pole piece, and wherein the textured surface is adjacent a gap between the pole piece and the magnetic shield, which is opposite a trailing surface of the tip; and
an electrical conductor through which currents are passed to effect changes in a magnetic field produced at the tip, wherein the textured surface comprises a series of grooves parallel to the magnetic recording medium and perpendicular to a direction of motion of the medium, and wherein the grooves have widths in the range of 10 nm to 50 nm.

12. The writer of claim 11 wherein the textured surface includes additions of rare earth elements.

* * * * *